(12) United States Patent
Sakurai et al.

(10) Patent No.: US 10,139,033 B2
(45) Date of Patent: Nov. 27, 2018

(54) RESIN COATING LAYER AND LIFE-EXTENSION METHOD FOR PIPING

(71) Applicant: MITSUBISHI HEAVY INDUSTRIES, LTD., Tokyo (JP)

(72) Inventors: Hideaki Sakurai, Tokyo (JP); Tsuyoshi Miyachi, Tokyo (JP); Seiji Kagawa, Tokyo (JP); Takuya Okamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 351 days.

(21) Appl. No.: 14/381,094

(22) PCT Filed: Feb. 7, 2013

(86) PCT No.: PCT/JP2013/052882
§ 371 (c)(1),
(2) Date: Aug. 26, 2014

(87) PCT Pub. No.: WO2013/129065
PCT Pub. Date: Sep. 6, 2013

(65) Prior Publication Data
US 2015/0024140 A1    Jan. 22, 2015

(30) Foreign Application Priority Data

Feb. 29, 2012    (JP) .................................. 2012-044639

(51) Int. Cl.
*B05D 7/22*       (2006.01)
*F16L 58/10*      (2006.01)
(Continued)

(52) U.S. Cl.
CPC .......... *F16L 58/1009* (2013.01); *B05D 7/222* (2013.01); *C09D 7/61* (2018.01);
(Continued)

(58) Field of Classification Search
CPC . B05D 1/007; B05D 1/04; B05D 1/06; B05D 7/22; B05D 7/222; B05D 2254/04
See application file for complete search history.

(56) References Cited

U.S. PATENT DOCUMENTS 2,962,052 A  *  11/1960  Sergovic ................. B05D 7/22
                                                      138/141
3,074,808 A  *  1/1963   Harrison ................ B05D 7/222
                                                      118/408
(Continued)

FOREIGN PATENT DOCUMENTS

CN          1810490 A       8/2006
CN        101219904 A       7/2008
(Continued)

OTHER PUBLICATIONS

Gilbilaro et al. On the apparent viscosity of a fluidized bed. Chemical Engineering Science 62 (2007)(294-300) (Year: 2007).*
(Continued)

*Primary Examiner* — David P Turocy
(74) *Attorney, Agent, or Firm* — Westerman, Hattori, Daniels & Adrian, LLP

(57) ABSTRACT

A resin coating layer according to the present invention is formed by curing a thermo-setting resin composition on an inner wall of a heat transfer tube. Forming the resin coating layer allows the heat transfer tube to be easily repaired without involving a cutting process of the heat transfer tube.

4 Claims, 7 Drawing Sheets

(51) Int. Cl.
  *F28F 19/04* (2006.01)
  *F16L 55/164* (2006.01)
  *C09D 7/61* (2018.01)
  *F28D 1/047* (2006.01)
  *B05D 1/00* (2006.01)
  *B05D 3/02* (2006.01)
  *B05D 1/42* (2006.01)

(52) U.S. Cl.
  CPC ............ *F16L 55/164* (2013.01); *F28F 19/04* (2013.01); *B05D 1/007* (2013.01); *B05D 1/42* (2013.01); *B05D 3/0254* (2013.01); *B05D 2401/32* (2013.01); *F28D 1/0477* (2013.01)

(56) References Cited

U.S. PATENT DOCUMENTS

| | | | | |
|---|---|---|---|---|
| 3,376,152 A | * | 4/1968 | Nishikawa | B05D 7/222 |
| | | | | 118/308 |
| 3,850,660 A | * | 11/1974 | Inamura | B05B 5/12 |
| | | | | 118/306 |
| 3,946,125 A | * | 3/1976 | Scheiber | B05D 7/22 |
| | | | | 118/312 |
| 3,982,050 A | * | 9/1976 | Kato | F16L 58/1036 |
| | | | | 118/317 |
| 4,107,254 A | * | 8/1978 | Webster | B05C 7/04 |
| | | | | 264/102 |
| 4,169,187 A | * | 9/1979 | Glazar | B05D 7/14 |
| | | | | 427/181 |
| 4,169,906 A | * | 10/1979 | Hallstrom | F16L 57/06 |
| | | | | 138/110 |
| 4,987,001 A | * | 1/1991 | Knobbe | B05B 5/12 |
| | | | | 118/312 |
| 5,173,325 A | | 12/1992 | Knobbe et al. | |
| 7,105,202 B2 | * | 9/2006 | Okamoto | B05D 7/222 |
| | | | | 427/238 |
| 2003/0180456 A1 | * | 9/2003 | Yamada | B05C 7/04 |
| | | | | 427/230 |
| 2005/0255240 A1 | * | 11/2005 | Okamoto | B05D 7/222 |
| | | | | 427/230 |
| 2005/0287294 A1 | * | 12/2005 | Horn | B05C 7/08 |
| | | | | 427/230 |
| 2006/0169170 A1 | * | 8/2006 | Endoh | C04B 24/2647 |
| | | | | 106/14.05 |
| 2010/0218912 A1 | * | 9/2010 | Lawless | C09K 8/467 |
| | | | | 165/45 |
| 2011/0018256 A1 | * | 1/2011 | Abarca Melo | B05D 7/222 |
| | | | | 285/179 |
| 2011/0133361 A1 | * | 6/2011 | Abarca Melo | B05D 7/222 |
| | | | | 264/269 |

FOREIGN PATENT DOCUMENTS

| | | |
|---|---|---|
| EP | 0 382 503 A1 | 8/1990 |
| EP | 1 431 417 A2 | 6/2004 |
| EP | 2 065 631 A1 | 6/2009 |
| JP | 51-13842 A | 2/1976 |
| JP | 54-120578 A | 9/1979 |
| JP | 58-2470 Y2 | 1/1983 |
| JP | 58-24195 B2 | 5/1983 |
| JP | 62191077 A * | 8/1987 |
| JP | 62-53226 B2 | 11/1987 |
| JP | 5-88667 B2 | 12/1993 |
| JP | 6-79237 A | 3/1994 |
| JP | 9-276793 A | 10/1997 |
| JP | H10-286505 | 10/1998 |
| JP | 11-276990 A | 10/1999 |
| JP | 3113254 B2 | 11/2000 |
| JP | 3122641 B2 | 1/2001 |
| JP | 3338636 B2 | 10/2002 |
| JP | 2007-38151 A | 2/2007 |
| JP | 2011-2115 A | 1/2011 |
| JP | 2011-27288 A | 2/2011 |
| TW | 201037203 A1 | 10/2010 |
| WO | 2011/037807 A2 | 3/2011 |

OTHER PUBLICATIONS

Notice of Allowance dated Jan. 27, 2016, issued in counterpart Taiwanese Patent Application No. 102105793, with English translation. (9 pages).
Office Action dated May 5, 2015, issued in counterpart Chinese Patent Application No. 201380010878.7, w/English translation (28 pages).
Japanese Office Action dated Aug. 18, 2015, issued in corresponding JP Patent Application No. 2012-0446369, with English translation (17 pages).
Written Opinion of the ISA PCT/JP2013/052882 dated Jul. 5, 2013, with English translation, (7 pages).
Office Action dated Sep. 17, 2015, issued in counterpart Taiwan Application No. 102105793, with English translation. (15 pages).
Extended European Search Report dated Oct. 21, 2015, issued in counterpart EP Application No. 13755412.7. (7 pages).
Notice of Allowance dated Jan. 26, 2016, issued in counterpart Japanese Patent Application No. 2012-044639, with English translation, (5 pages).
International Search Report dated May 7, 2013, issued in corresponding application No. PCT/JP2013/052882.
Written Opinion dated May 7, 2013, issued in corresponding application No. PCT/JP2013/052882.
Notification of Completion of Formalities for Registration and Notification of Grant of Invention Patent dated Aug. 24, 2016, issued in counterpart Chinese Patent Application No. 201380010878.7, with English translation. (4 pages).
Communication under Rule 71(3) EPC dated Sep. 14, 2016, issued in counterpart European Patent Application No. 13755412.7. (35 pages).
Notice of Allowance dated Sep. 29, 2016, issued in counterpart Canadian Patent Application No. 2,865,532. (1 page).

* cited by examiner

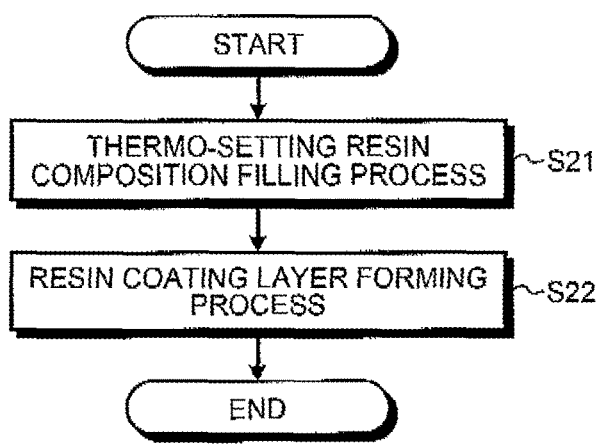
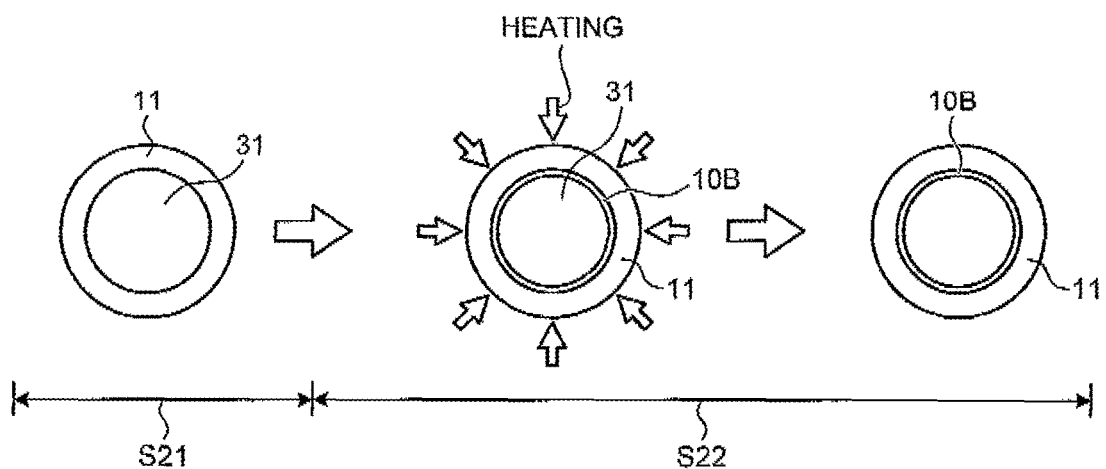

RESIN COATING LAYER AND LIFE-EXTENSION METHOD FOR PIPING

FIELD

The present invention relates to a resin coating layer and a life-extension method for piping that are used in a repair of a thinned heat exchanger tube (heat transfer tube) of a heat exchanger due to corrosion or the like and in life-extension processing for the thinned heat exchanger tube.

BACKGROUND

A large number of heat exchanger tubes (heat transfer tubes) are provided to a shell (body) of a heat exchanger. A long-term operation of a heat exchanger may cause corrosion thinning, corrosion cracks, hydrogen embrittlement cracks, or the like in a body or a heat transfer tube of the heat exchanger. Therefore, the heat transfer tube of the heat exchanger is subjected to periodic inspection, in which a thickness thereof is measured. When a portion of the heat transfer tube where the thickness of the tube has been too reduced, due to corrosion, to potentially cause breakage such as holes by the next inspection, a repair is performed.

For example, a frequency of the inspection is set as follows: (A) the periodic inspection for the entire plant is performed every two years, and the inspection continues for about two months; (B) a small-scale inspection is performed one year after the periodic inspection, and the inspection continues for about two weeks; (C) in addition, the plant may be stopped irregularly for about two days to one week.

Generally, when there is a possibility of occurrence of breakage of the heat transfer tube due to thinning thereof by the next inspection, a repair is performed by: fusing the portion having a risk of breakage and welding a new heat transfer tube to that portion; repairing the portion having a risk of breakage while bypassing a heating medium such as flue gas (refer, for example, Patent Literatures 1 and 2).

CITATION LIST

Patent Literature

Patent Literature 1: Japanese Laid-open Patent Publication No. 2011-2115
Patent Literature 2: Japanese Laid-open Patent Publication No. 2011-27288

SUMMARY

Technical Problem

In a conventional repair work of the heat transfer tube, the tube is cut at above and below the portion having a risk of breakage, and a new heat transfer tube is connected to the cut portions. In particular, as the heat exchanger is provided with the heat transfer tubes densely arranged, when a heat transfer tube in a depth part is thinned, a heat transfer tube (or tubes) on a near side is also cut for ensuring a working space. Thus, in a conventional repair method for the heat transfer tube, it takes time and cost to repair the heat transfer tube. This may cause, depending on the set inspection frequency, the inspection itself can be performed, but the repair work cannot be carried out in some cases.

Under such a circumstance, there is demanded a repair method that can easily and temporarily repair the heat transfer tube thinned due to corrosion or the like.

The present invention has been made in view of the above problems, and an object thereof is to provide a resin coating layer and a life-extension method for piping that allow piping to be easily repaired without involving a cutting process of the piping.

Solution to Problem

According to a first aspect of the present invention in order to solve the above problems, there is provided a resin coating layer formed by curing a thermo-setting resin composition on an inner wall of piping for feeding liquid/gas in a chemical plant or a power plant.

According to a second aspect of the present invention, there is provided the resin coating layer according to the first aspect, which is formed by sticking resin fine particles, being obtained by charging particles of the thermo-setting resin composition, to the inner wall of the piping by electrostatic force while supplying the resin fine particles into the piping and, subsequently, by heating the piping to cure the resin fine particles.

According to a third aspect of the present invention, there is provided the resin coating layer according to the second aspect, wherein an average particle diameter of the resin fine particles is not less than 30 μm and not more than 50 μm.

According to a fourth aspect of the present invention, there is provided the resin coating layer according to the first aspect, which is formed by supplying the thermo-setting resin composition into the piping to fill the piping with the thermo-setting resin composition and, subsequently, heating the piping from outside the piping to cure the thermo-setting resin composition on the inner wall side of the piping while removing uncured thermo-setting resin composition on an inner side of the piping.

According to a fifth aspect of the present invention, there is provided the resin coating layer according to the fourth aspect, wherein gas or air is supplied into the piping to extract the uncured thermo-setting resin composition inside the piping while the piping is heated.

According to a sixth aspect of the present invention, there is provided a life-extension method for piping including: a resin fine particle sticking step of sticking, by electrostatic force, resin fine particles, which are obtained by charging particles of a thermo-setting resin composition, to an inner wall of piping for feeding liquid/gas in a chemical plant or a power plant while supplying the resin fine particles into the piping; and a resin coating layer forming step of forming a resin coating layer by heating the piping to cure the resin fine particles stuck to the inner wall of the piping.

According to a seventh aspect of the present invention, there is provided the life-extension method for piping according to the sixth aspect, wherein an average particle diameter of the resin fine particles is not more than 30 μm and not less than 50 μm.

According to an eighth aspect of the present invention, there is provided the life-extension method for piping including: a thermo-setting resin composition filling step of supplying a thermo-setting resin composition into piping for feeding liquid/gas in a chemical plant or a power plant to fill the piping with the thermo-setting resin composition; and a resin coating layer forming step of heating the piping to cure the thermo-setting resin composition on an inner wall side of the piping while removing uncured thermo-setting resin composition on an inner side of the piping to form a resin coating layer on an inner wall of the piping.

According to a ninth aspect of the present invention, there is provided the life-extension method for piping according to the eighth aspect, wherein gas or air is supplied into the piping to extract the uncured thermo-setting resin composition inside the piping while the piping is heated.

Advantageous Effects of Invention

According to the present invention, the resin coating layer is formed on the inner wall of the heat transfer tube having a defective part, so that it is possible to easily repair the heat transfer tube without involving a cutting process of the heat transfer tube.

BRIEF DESCRIPTION OF DRAWINGS

FIG. 5 is a flowchart illustrating an example of a life extension method for piping according to a second embodiment of the present invention.

FIG. 6 is an explanatory view illustrating a forming process of the resin coating layer.

DESCRIPTION OF EMBODIMENTS

Hereinafter, the present invention will be described with reference to the drawings. It should be noted that the present invention is not limited to the following embodiments. In addition, constituting elements in the following embodiments include elements which may be easily assumed by those skilled in the art, which are substantially the same, and which are so-called in an equivalent range. Moreover, constituent elements disclosed in the following embodiments may be appropriately combined.

First Embodiment

Figure 1:
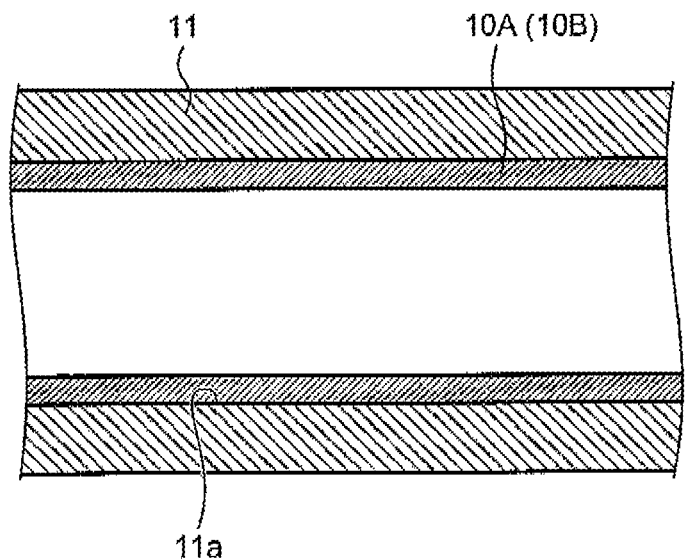
FIG. 1 is a schematic view illustrating a resin coating layer according to a first embodiment of the present invention.

A resin coating layer according to a first embodiment of the present invention will be described with reference to the drawings. In the present embodiment, as a piping for feeding liquid/fluid in a chemical plant or a power plant, a heat transfer tube provided in a heat exchanger is used. FIG. 1 is a schematic view illustrating the resin coating layer according to the first embodiment of the present invention. As illustrated in FIG. 1, a resin coating layer 10A according to the present embodiment is formed on an inner wall 11a of a heat transfer tube (piping) 11.

The resin coating layer 10A according to the embodiment is formed by curing fine particles of a thermo-setting resin composition whose curing reaction is started at a low temperature. As the thermo-setting resin composition, a resin composition mainly containing, for example, a phenol resin, a urea resin, a melamine resin, an epoxy resin, a polyurethane resin, or the like can be used. In the present embodiment, it is preferable to use a thermo-setting resin composition mainly containing an epoxy resin because of the following reasons: it can contact a heating medium inside the heat transfer tube 11; it can stably withstand temperature changes of the heat transfer tube 11; it is easy to use and handle; and it is advantageous in cost reduction. The thermo-setting resin composition used for forming the resin coating layer 10A according to the present embodiment may be used singly or in combination of two or more. The low temperatures stated herein refer to those in a temperature range of not less than 70° C. and not more than 180°, preferably not less than 120° C. and not more than 160°, more preferably not less than 140° C. and not more than 155°, and still more preferably about 150°.

Further, the thermo-setting resin composition preferably contains metal particles such as aluminum pigments. The thermo-setting resin composition containing the metal particles can suppress reduction in thermal conductivity of the heat transfer tube 11 when the heating medium is fed into the heat transfer tube 11.

A film thickness of the resin coating layer 10A according to the embodiment is preferably in a range of not less than 0.1 mm and not more than 15 mm in terms of a size of an inner diameter of the heat transfer tube 11 and performance in suppressing deterioration due to the heating medium flowing in the heat transfer tube 11, more preferably not less than 0.5 mm and not more than 10 mm, and still more preferably not less than 1 mm and not more than 5 mm.

Forming the resin coating layer 10A according to the embodiment on the inner wall 11a of the heat transfer tube 11 allows the heat transfer tube 11 thinned due to corrosion or the like to be easily repaired without involving a cutting process of the heat transfer tube 11.

Figure 2:
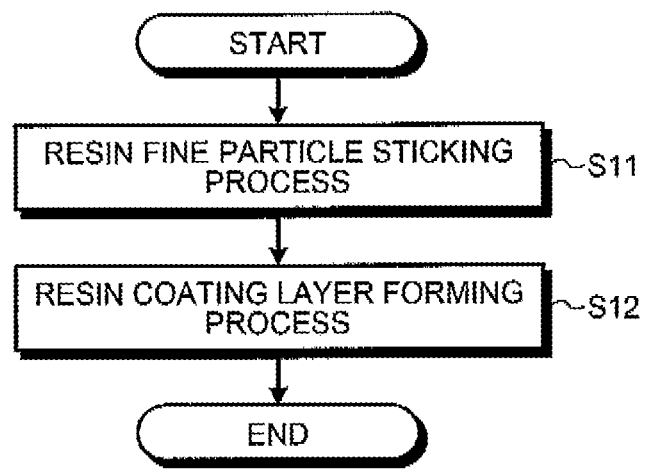
FIG. 2 is a flowchart illustrating an example of a life extension method for piping according to the first embodiment of the present invention.
Figure 3:
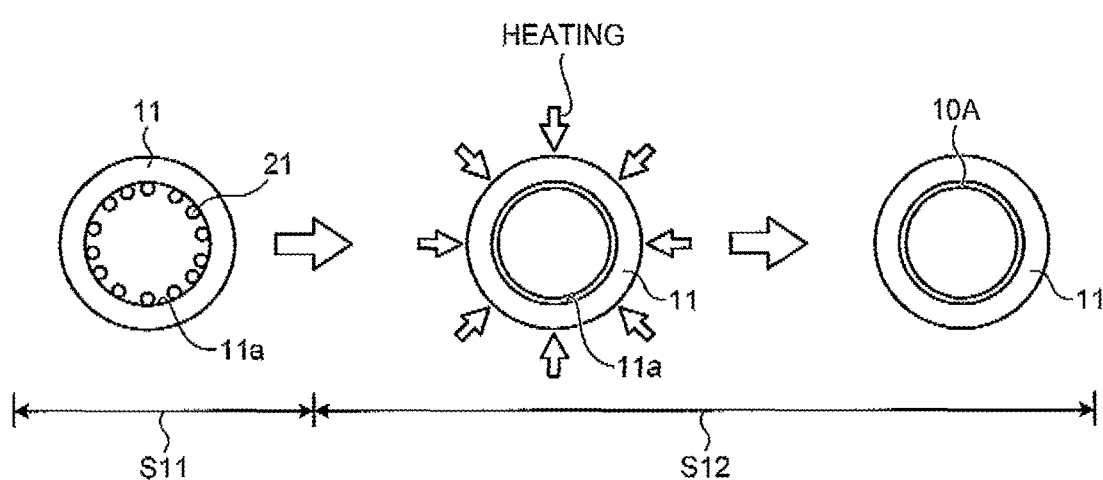
FIG. 3 is an explanatory view illustrating a forming process of the resin coating layer.

An example of a life extension method for piping according to the present embodiment that forms the thus configured resin coating layer 10A will be described using the drawings. FIG. 2 is a flowchart illustrating an example of the life extension method for piping according to the present embodiment, and FIG. 3 is an explanatory view illustrating a forming process of the resin coating layer. As illustrated in FIG. 2, the life extension method for piping according to the present embodiment includes the following processes:

(a) resin fine particle sticking process (step S11) in which resin fine particles 21 obtained by charging particles of the thermo-setting resin composition are supplied into the heat transfer tube (piping) 11, and the resin fine particles 21 are stuck to the inner wall 11a of the heat transfer tube 11 by electrostatic force; and (b) resin coating layer forming process (step S12) in which the heat transfer tube 11 is heated to cure the resin fine particles 21 stuck to the inner wall 11a of the heat transfer tube 11 to thereby form the resin coating layer 10A.

Figure 4:
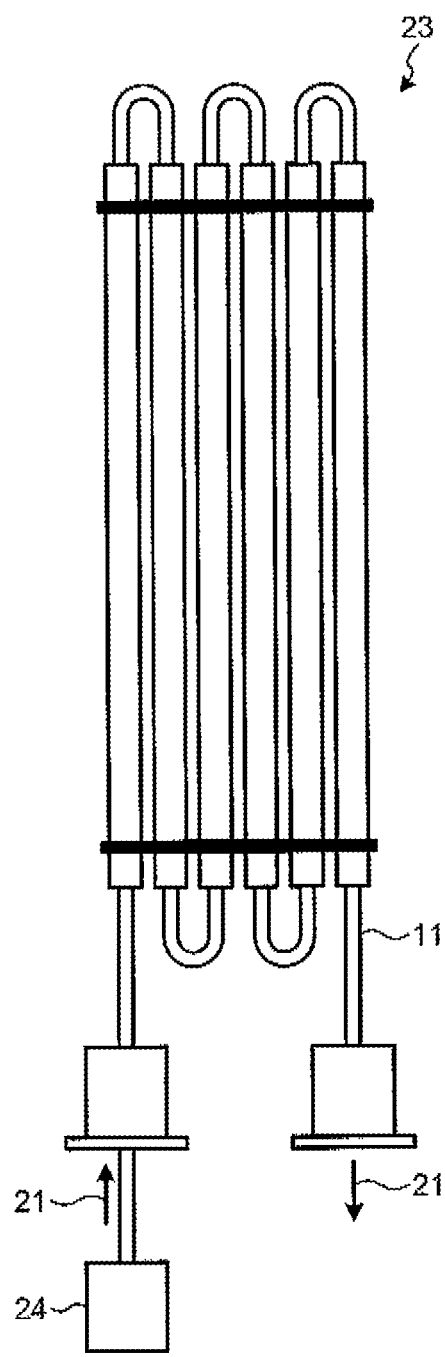
FIG. 4 is a view illustrating a part of a heat exchanger.

As illustrated in FIG. 4, a resin fine particle supply means 24 for supplying the resin fine particles 21 into the heat transfer tube 11 is provided outside a heat exchanger 23. The resin fine particles 21 are supplied from the resin fine particle supply means 24 into the heat transfer tube 11 of the heat exchanger 23. Then, as illustrated in FIG. 3, the resin fine particles 21 supplied into the heat transfer tube 11 are stuck to the inner wall 11a of the heat transfer tube 11 by electrostatic force (step S11).

As described above, the resin fine particles 21 are particles obtained by charging particles of the thermo-setting resin composition. As a material for forming the resin fine particles 21, the above-mentioned thermo-setting resin composition whose curing reaction is started at a low temperature is used. As the thermo-setting resin composition, a resin composition mainly containing, for example, a phenol resin, a urea resin, a melamine resin, an epoxy resin, a polyurethane resin, or the like can be used. In the present embodiment, it is preferable to use a thermo-setting resin composition mainly containing an epoxy resin because of the following reasons: it can contact a heating medium inside the heat transfer tube 11; it can stably withstand temperature changes of the heat transfer tube 11; it is easy to use and handle; and it is advantageous in cost reduction. The thermo-setting resin composition used for forming the resin coating layer 10A according to the present embodiment may be used singly or in combination of two or more.

Further, as described above, the thermo-setting resin composition preferably contains metal particles such as aluminum pigments. The thermo-setting resin composition containing the metal particles can suppress reduction in thermal conductivity of the heat transfer tube 11 when the heating medium is fed into the heat transfer tube 11.

An average particle diameter of the resin fine particles 21 is preferably in a range of not less than 10 μm and not more than 150 μm so that the resin fine particles 21 are stably supplied into the heat transfer tube 11 and stably stuck to the entire surface of the inner wall 11a of the heat transfer tube 11, more preferably not less than 30 μm and not more than 50 μm, and still more preferably, not less than 35 μm and not more than 45 μm.

The charged resin fine particles 21 are stored in the resin fine particle supply means 24. As a method of charging the fine particles of the thermo-setting resin composition, a conventionally-known electrostatic method can be used. Specifically, examples of the electrostatic methods include a method in which a high voltage (e.g., −40 KV to −90 KV) obtained by a high-voltage electrostatic generator is applied to the fine particles of the thermo-setting resin composition to charge the same.

The resin fine particles 21 supplied into the heat transfer tube 11 are stuck to the inner wall 11a of the heat transfer tube 11 by electrostatic force.

In the present embodiment, the resin fine particles 21 are previously charged so as to be stuck to the inner wall 11a of the heat transfer tube 11 by electrostatic force. Alternatively, however, an electrostatic device may be used to stick the resin fine particles 21 to the inner wall 11a of the heat transfer tube 11. The use of the electrostatic device allows the resin fine particles 21 to be stuck to the inner wall 11a of the heat transfer tube 11 more stably.

After sticking of the resin fine particles 21 to the inner wall 11a of the heat transfer tube 11, the heat transfer tube 11 is heated to cure the resin fine particles 21 stuck to the inner wall 11a of the heat transfer tube 11 to thereby form the resin coating layer 10A (step S12). Heating the heat transfer tube 11 from outside increases a temperature of the inner wall 11a of the heat transfer tube 11, thereby curing the resin fine particles 21 stuck to the inner wall 11a of the heat transfer tube 11.

Examples of a heating method for the heat transfer tube 11 includes: heating an outer peripheral surface of the heat transfer tube 11 using a heating electric wire attached to the outer peripheral surface of the heat transfer tube 11; heating the outer peripheral surface of the heat transfer tube 11 using a heater; and heating the heat transfer tube 11 using high-temperature gas (flue gas) flowing in a shell (body) of the heat exchanger 23.

By curing the resin fine particles 21 stuck to the inner wall 11a of the heat transfer tube 11, adjacent resin fine particles 21 are bonded to each other to thereby form the resin coating layer 10A according to the present embodiment on the inner wall 11a of the heat transfer tube 11.

Further, in the present embodiment, the number of times that the resin fine particle supply means 24 supplies the resin fine particles 21 into the heat transfer tube 11 is set to one, but the number is not limited thereto. The resin fine particle supply means 24 may supply the resin fine particles 21 into the heat transfer tube 11 plurality of times depending on a size of the inner diameter of the heat transfer tube 11, a sticking condition of the resin fine particles 21 to the inner wall 11a of the heat transfer tube 11, and the like.

Thus, by using the life-extension method for piping according to the present embodiment, the resin coating layer 10A according to the present embodiment can be formed on the inner wall 11a of the heat transfer tube 11. Even if a defect, such as cracks or holes, occurs in the heat transfer tube 11 resulting from progress of corrosion at a portion of the heat transfer tube 11 where thinning or the like occurs, forming the resin coating layer 10A according to the present embodiment on the inner wall 11a of the heat transfer tube 11 allows the heat transfer tube 11 to be temporarily and easily repaired without involving a cutting process of the heat transfer tube 11. As a result, it is possible to prevent the heating medium flowing in the heat transfer tube 11 from leaking outside. Further, the resin fine particles 21 contain the metal particles, so that even when the resin coating layer 10A according to the present embodiment is formed in the heat transfer tube 11, it is possible to suppress reduction in thermal conductivity of the heat transfer tube 11 when the heating medium is fed into the heat transfer tube 11, which in turn can suppress reduction in performance of the heat exchanger 23.

Second Embodiment

A resin coating layer according to a second embodiment of the present invention will be described with reference to the drawings. Like the resin coating layer 10A according to the first embodiment illustrated in FIG. 1, a resin coating layer 10B according to the present embodiment is formed on an inner wall 11a of a heat transfer tube 11.

The resin coating layer 10B according to the present embodiment is formed by curing a thermo-setting resin composition whose curing reaction is started at a low temperature. As the thermo-setting resin composition, a resin composition mainly containing, for example, a phenol resin, a urea resin, a melamine resin, an epoxy resin, a polyurethane resin, or the like can be used. In the present embodiment, it is preferable to use a resin composition mainly containing an epoxy resin because of the following reasons: it can contact a heating medium inside the heat transfer tube 11; it can stably withstand temperature changes of the heat transfer tube 11; it is easy to use and handle; and it is advantageous in cost reduction. The thermo-setting resin composition used for forming the resin coating layer 10B according to the present embodiment may be used singly or in combination of two or more. The low temperatures stated herein refer to those in a temperature range of not less than 40° C. and not more than 60°.

Forming the resin coating layer 10B according to the embodiment on the inner wall 11a of the heat transfer tube 11 allows the heat transfer tube 11 thinned due to corrosion or the like to be easily repaired without involving a cutting process of the heat transfer tube 11.

Further, the thermo-setting resin composition preferably contains metal particles such as aluminum pigments. The thermo-setting resin composition containing the metal particles can suppress reduction in thermal conductivity of the heat transfer tube 11 when the heating medium is fed into the heat transfer tube 11.

An example of a life extension method for piping according to the present embodiment that forms the thus configured resin coating layer 10B will be described using the drawings. FIG. 5 is a flowchart illustrating an example of the life extension method for piping according to the present embodiment, and FIG. 6 is an explanatory view illustrating a forming process of the resin coating layer. As illustrated in FIG. 5, the life extension method for piping according to the present embodiment includes the following processes:

(a) thermo-setting resin composition filling process (step S21) in which a thermo-setting resin composition 31 is supplied into the heat transfer tube 11 to fill the heat transfer tube 11 therewith; and (b) resin coating layer forming process (step S22) in which the heat transfer tube 11 is heated to cure the thermo-setting resin composition 31 on the inner wall 11a side of the heat transfer tube 11 while an uncured thermo-setting resin composition 31 on an inner side of the heat transfer tube 11 is removed to thereby form the resin coating layer 10B on the inner wall 11a of the heat transfer tube 11.

As illustrated in FIG. 6, the thermo-setting resin composition 31 is supplied into the heat transfer tube 11 of a heat exchanger 23 to fill the heat transfer tube 11 therewith (step S21).

Figure 7:
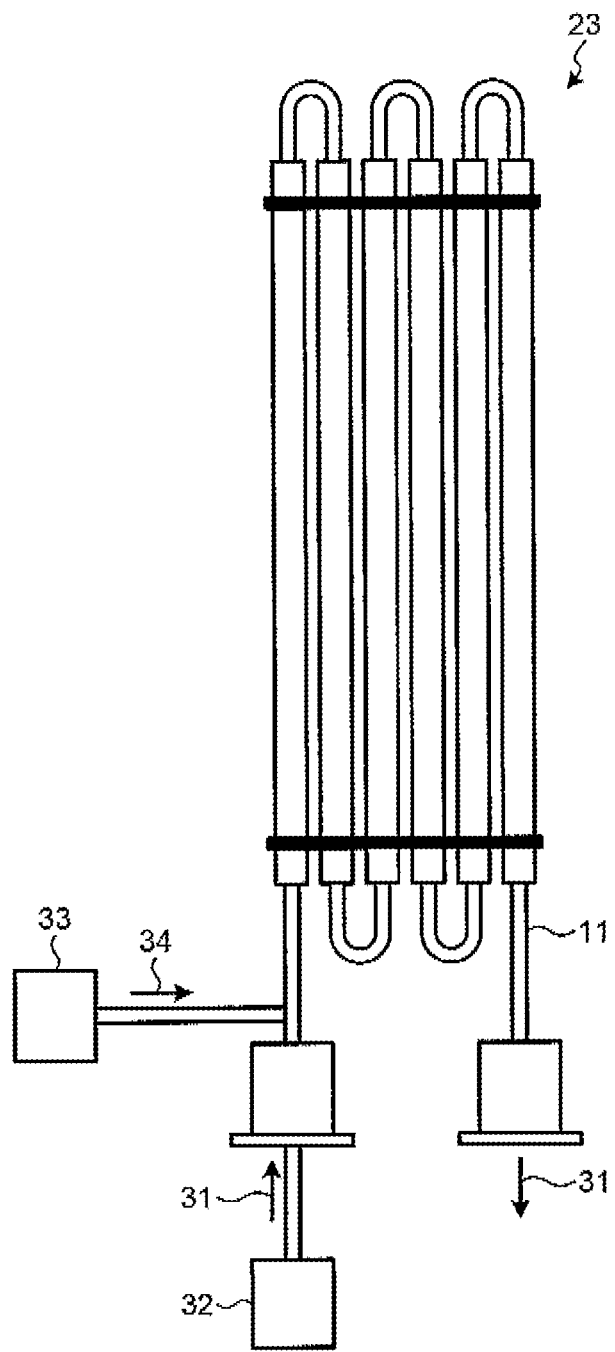
FIG. 7 is an explanatory view illustrating a configuration for supplying air into the heat transfer tube.

As illustrated in FIG. 7, a thermo-setting resin composition supply means 32 for supplying the thermo-setting resin composition 31 into the heat transfer tube 11 is provided outside the heat exchanger 23. The thermo-setting resin composition 31 is supplied from the thermo-setting resin composition supply means 32 into the heat transfer tube 11 of the heat exchanger 23.

As described above, as a material for forming the thermo-setting resin composition 31, the thermo-setting resin composition whose curing reaction is started at a low temperature is used. As the thermo-setting resin composition, a resin composition mainly including, for example, a phenol resin, a urea resin, a melamine resin, an epoxy resin, a polyurethane resin, or the like can be used. In the present embodiment, it is preferable to use a resin composition mainly including an epoxy resin because of the following reasons: it can contact a heating medium inside the heat transfer tube 11; it can stably withstand temperature changes of the heat transfer tube 11; it is easy to use and handle; and it is advantageous in cost reduction. The thermo-setting resin composition used for forming the resin coating layer 10B according to the present embodiment may be used singly or in combination of two or more.

Further, as described above, the thermo-setting resin composition 31 preferably contains the metal particles such as aluminum pigments. The thermo-setting resin composition containing the metal particles can suppress reduction in thermal conductivity of the heat transfer tube 11 when the heating medium is fed into the heat transfer tube 11.

When the thermo-setting resin composition 31 is supplied into the heat transfer tube 11, a solution containing the thermo-setting resin composition 31 may be supplied considering a viscosity of the thermo-setting resin composition 31.

After the heat transfer tube 11 is filled with the thermo-setting resin composition 31, the heat transfer tube 11 is heated from outside to cure the thermo-setting resin composition 31 on the inner wall 11a side of the heat transfer tube 11 while the uncured thermo-setting resin composition 31 on the inner side of the heat transfer tube 11 is removed (step S22).

As described in the previous embodiment, examples of a heating method for the heat transfer tube 11 includes: heating an outer peripheral surface of the heat transfer tube 11 using a heating electric wire attached to the outer peripheral surface of the heat transfer tube 11; heating the outer peripheral surface of the heat transfer tube 11 using a heater; and heating the heat transfer tube 11 using high-temperature gas (flue gas) flowing in a shell (body) of the heat exchanger 23.

Further, when the heat transfer tube 11 is heated from outside, a heating temperature, a heating time, and the like are controlled considering the diameter size of the heat transfer tube 11 and the like. This causes a temperature difference in the thermo-setting resin composition 31 inside the heat transfer tube 11, thereby allowing a difference in progress of the curing reaction of the thermo-setting resin composition 31 in the heat transfer tube 11 to be made. As a result, it is possible to adjust a thickness of the thermo-setting resin composition 31 to be cured in the heat transfer tube 11.

Figure 8:
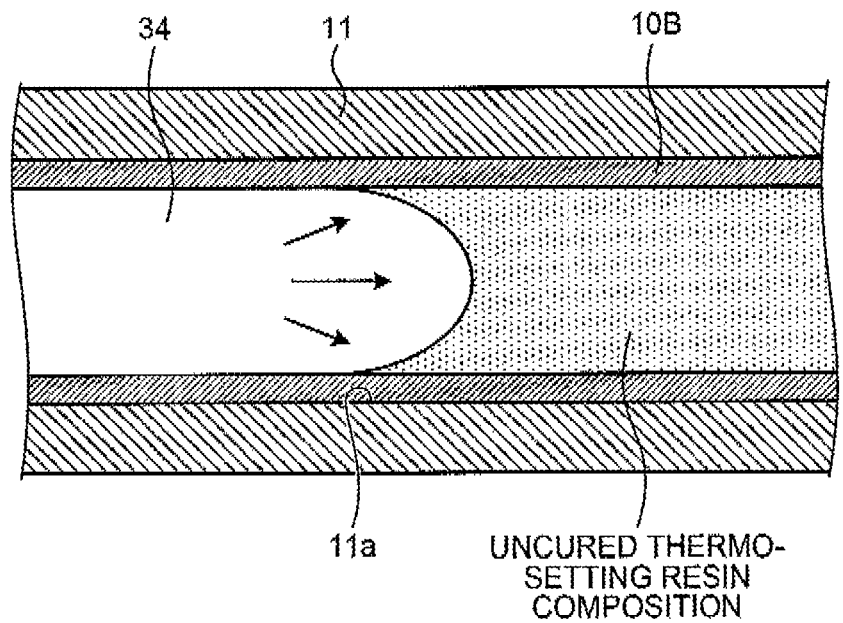
FIG. 8 is an explanatory view illustrating a state where air is introduced into the heat transfer tube.

Further, as illustrated in FIG. 7, an air supply means 33 is provided outside the heat exchanger 23. The air supply means 33 introduces air 34 into the heat transfer tube 11 to extract the uncured thermo-setting resin composition 31 on the inner side of the heat transfer tube 11. The heat transfer tube 11 is heated from outside, so that the heat is transferred from the inner wall 11a side of the heat transfer tube 11. Accordingly, the temperature is higher at the inner wall 11a side of the heat transfer tube 11 than at a center portion thereof. Thus, the thermo-setting resin composition 31 in the vicinity of the inner wall 11a of the heat transfer tube 11 is cured faster than the thermo-setting resin composition 31 existing around the center of the heat transfer tube. Further, the uncured thermo-setting resin composition 31 is in a high viscosity state, while the cured thermo-setting resin composition 31 is low in viscosity and stuck to the inner wall 11a of the heat transfer tube 11. Thus, as illustrated in FIG. 8, by introducing the air 34 into the heat transfer tube 11, it is possible to remove only the uncured thermo-setting resin composition 31 on the inner side of the heat transfer tube 11 while curing the thermo-setting resin composition 31 on the inner wall 11a side of the heat transfer tube 11.

As a result, a hollow resin film can be formed in the heat transfer tube 11, whereby the resin coating layer 10B according to the present embodiment is formed only at the inner wall 11a side of the heat transfer tube 11.

Further, in the present embodiment, the air 34 is introduced from the air supply means 33 provided outside the heat exchanger 23 into the heat transfer tube 11, but what is introduced is not limited thereto. An inert gas such as nitrogen ($N_2$) gas or argon (Ar) gas may be introduced.

Figure 9:
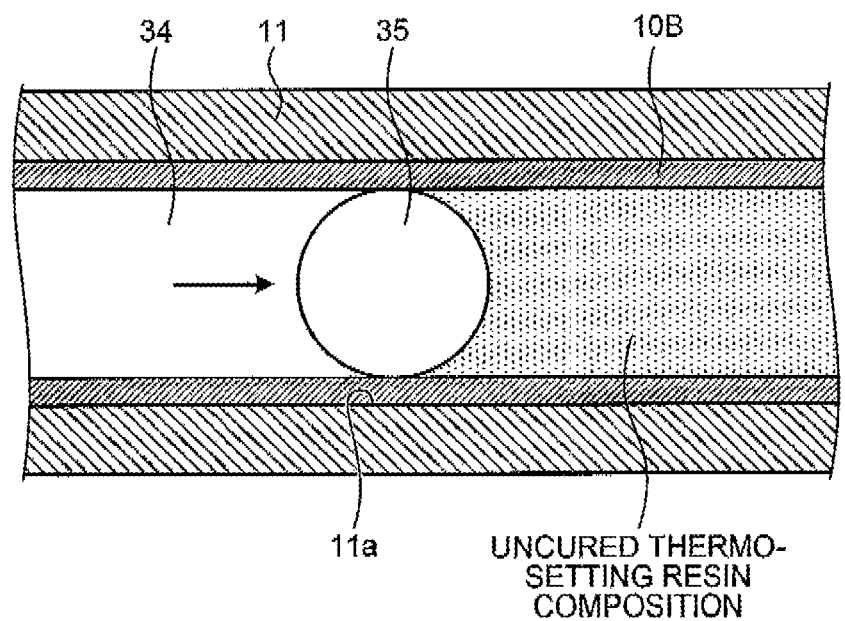
FIG. 9 is a view illustrating an example of a method of removing an uncured thermo-setting resin composition.
Figure 10:
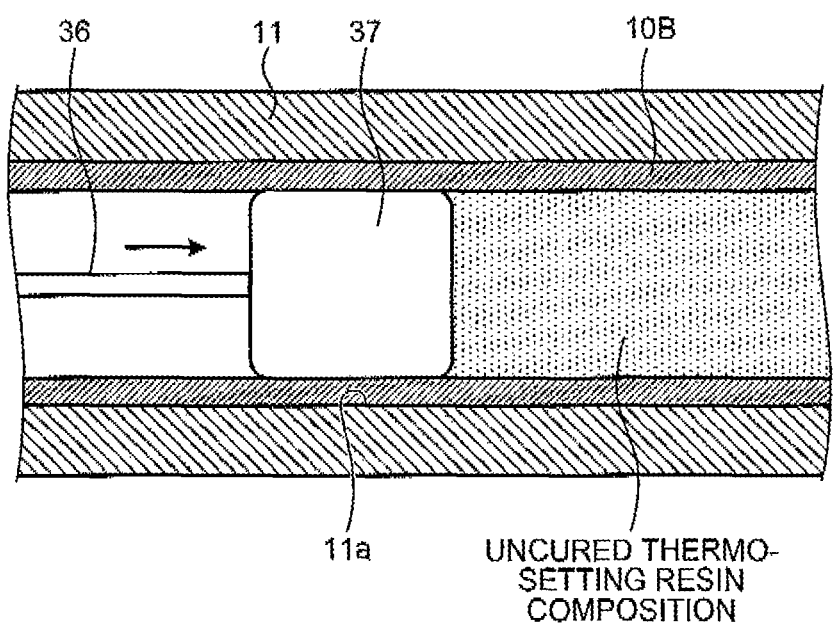
FIG. 10 is a view illustrating an example of a method of removing an uncured thermo-setting resin composition.

Further, in the present embodiment, the air supply means 33 is used as a means for removing only the uncured thermo-setting resin composition 31 on the inner side of the heat transfer tube 11, but the means is not limited thereto. FIGS. 9 and 10 are views each illustrating an example of a method of removing the uncured thermo-setting resin composition. As illustrated in FIG. 9, a spherical body 35 is introduced to supply the air 34 into the heat transfer tube 11, thereby allowing removal of only the uncured thermo-setting resin composition 31 on the inner side of the heat transfer tube 11 while curing the uncured thermo-setting resin composition 31 in the heat transfer tube 11.

Further, as illustrated in FIG. 10, by fitting a pushing member 37 having a diameter smaller than the inner diameter of the heat transfer tube 11 to a leading end of a cable 36 and introducing the pushing member 37 into the heat transfer tube 11, only the uncured thermo-setting resin composition 31 on the inner side of the heat transfer tube 11 can be removed.

Further, in the present embodiment, the number of times that the thermo-setting resin composition supply means 32 supplies the thermo-setting resin composition 31 into the heat transfer tube 11 is set to one, but the number is not limited thereto. The thermo-setting resin composition supply means 32 may supply the thermo-setting resin composition 31 into the heat transfer tube 11 plurality of times depending on the size of the inner diameter of the heat transfer tube 11, a film thickness of the resin coating layer 10B formed on the inner wall 11a of the heat transfer tube 11, and the like.

Further, in the present embodiment, the number of times that the air supply means 33 supplies the air 34 into the heat transfer tube 11 is set to one, but the number is not limited thereto. The air supply means 33 may supply the air 34 into the heat transfer tube 11 plurality of times depending on the size of the inner diameter of the heat transfer tube 11 and the like, a film thickness of the resin coating layer 10B formed by the thermo-setting resin composition 31 supplied into the heat transfer tube 11 at the first time, and the like.

Thus, by using the life-extension method for piping according to the present embodiment in which the difference in the temperature transferred to inside of the heat transfer tube 11 when the heat transfer tube 11 is heated from outside is utilized, only the uncured thermo-setting resin composition 31 can be removed from the heat transfer tube 11. Accordingly, the resin coating layer 10B according to the present embodiment can be formed only on the inner wall 11a side of the heat transfer tube 11. Thus, even if a defect such as cracks or holes occurs in the heat transfer tube 11 resulting from progress of corrosion at a portion of the heat transfer tube 11 where thinning or the like occurs, forming the resin coating layer 10B according to the present embodiment on the inner wall 11a of the heat transfer tube 11 allows the heat transfer tube 11 to be temporarily and easily repaired without involving a cutting process of the heat transfer tube 11. As a result, it is possible to prevent the heating medium flowing in the heat transfer tube 11 from leaking outside. Further, the resin coating layer 10B according to the present embodiment is cured by being heated from outside the heat transfer tube 11, so that a one-liquid type thermo-setting resin composition can be used to form the resin coating layer 10B. Thus, as compared to a case where a two-liquid type thermo-setting resin composition is used to form the resin coating layer 10B, a cured state, such as a film thickness, of the thermo-setting resin composition 31 can be easily adjusted. Further, the thermo-setting resin composition 31 contains the metal particles, so that even when the resin coating layer 10B according to the present embodiment is formed in the heat transfer tube 11, it is possible to suppress reduction in thermal conductivity of the heat transfer tube 11 when the heating medium is fed into the heat transfer tube 11, which in turn can suppress reduction in performance of the heat exchanger 23.

Although the present invention is applied to the heat transfer tube 11 provided in a fin-tube heat exchanger in the above embodiments, but the application is not limited thereto. The invention may be applied to heat exchangers of other types, such as a gas-to-liquid air-cooled heat exchanger and a direct contact heat exchanger. Further, the application of the resin coating layer 10A according to the present embodiment is not limited to a gas-to-liquid heat exchanger, but the resin coating layer 10A may be useful in a liquid-to-liquid heat exchanger or a gas-to-gas heat exchanger. Examples of the liquid-to-liquid heat exchanger include a spiral heat exchanger, a plate heat exchanger, a double-pipe heat exchanger, a shell-and-tube heat exchanger (multi-pipe cylindrical heat exchanger), a spiral tube heat exchanger, a spiral plate heat exchanger, a tank coil heat exchanger, a tank jacket heat exchanger, and a direct contact liquid-to-liquid heat exchanger. Examples of the gas-to-gas heat exchanger include a stationary heat exchanger, a regenerative rotary heat exchanger, a periodic flow regenerative heat exchanger, and a vortex tube.

Further, in the embodiments, the present invention is applied to the heat transfer tube provided in the heat exchanger, but the application is not limited thereto. For example, piping to be used in the present invention is not limited in particular as long as it can feed liquid/gas in a chemical plant, a power plant, or the like. Thus, for example, the present invention can also be applied to a repairing work of piping for corrosive liquid, piping for corrosive gas, piping for high-temperature water, piping for low-temperature water, or the like.

REFERENCE SIGNS LIST 10A, 10B RESIN COATING LAYER
11 HEAT TRANSFER TUBE
21 RESIN FINE PARTICLE
23 HEAT EXCHANGER
24 RESIN FINE PARTICLE SUPPLY MEANS
31 THERMO-SETTING RESIN COMPOSITION
32 THERMO-SETTING RESIN COMPOSITION SUPPLY MEANS
33 AIR SUPPLY MEANS
34 AIR
35 SPHERICAL BODY
36 CABLE
37 PUSHING MEMBER

The invention claimed is:

1. A life-extension method of a heat transfer tube, comprising:
   filling a viscous liquid thermo-setting resin into the heat transfer tube; and
   forming a resin coating layer on an inner wall of the heat transfer tube by simultaneously heating the entire outer peripheral surface of the heat transfer tube to cause a temperature difference in the thermo-setting resin filled-up inside the heat transfer tube so that temperature is higher at the inner wall side thereof than at a center portion thereof while simultaneously removing uncured thermo-setting resin composition in a viscosity state inside of the heat transfer tube by introducing gas or air into the heat transfer tube, thereby simultaneously curing the thermo-setting resin composition on the entire inner wall side of the heat transfer tube.

2. The life-extension method of the heat transfer tube according to claim 1, wherein the thermos-setting resin composition includes a phenol resin, an urea resin, a melamine resin, an epoxy resin or a polyurethane resin.

3. The life-extension method of the heat transfer tube according to claim 1, wherein the heat transfer tube is used for feeding corrosive liquid, corrosive gas, high-temperature water, low-temperature water.

4. The life-extension method of the heat transfer tube according to claim 1, wherein the heat transfer tube is a heat exchanger selected from any one of a fin-tube heat exchanger, an air-cooled heat exchanger, a direct contact heat exchanger, a spiral heat exchanger, a plate heat exchanger, a double-pipe heat exchanger, a shell-and-tube heat exchanger, a spiral tube heat exchanger, a spiral plate heat exchanger, a tank coil heat exchanger, a tank jacket heat exchanger, a direct contact liquid-to-liquid heat exchanger, a stationary heat exchanger, a regenerative rotary heat exchanger, a periodic flow regenerative heat exchanger, and a vortex tube.

* * * * *